(12) United States Patent
Arai et al.

(10) Patent No.: US 10,145,412 B2
(45) Date of Patent: Dec. 4, 2018

(54) FLUID DYNAMIC BEARING DEVICE AND MOTOR PROVIDED THEREWITH

(71) Applicant: NTN CORPORATION, Osaka (JP)

(72) Inventors: Takao Arai, Mie (JP); Fuyuki Ito, Mie (JP); Mikihisa Fujiwara, Mie (JP)

(73) Assignee: NTN CORPORATION, Osaka (JP)

(*) Notice: Subject to any disclaimer, the term of this patent is extended or adjusted under 35 U.S.C. 154(b) by 220 days.

(21) Appl. No.: 15/100,364

(22) PCT Filed: Dec. 5, 2014

(86) PCT No.: PCT/JP2014/082285
§ 371 (c)(1),
(2) Date: May 31, 2016

(87) PCT Pub. No.: WO2015/087809
PCT Pub. Date: Jun. 18, 2015

(65) Prior Publication Data
US 2016/0305473 A1    Oct. 20, 2016

(30) Foreign Application Priority Data

Dec. 11, 2013  (JP) .................................. 2013-255989
Dec. 4, 2014   (JP) .................................. 2014-245668

(51) Int. Cl.
| | | |
|---|---|---|
| H02K 5/167 | (2006.01) | |
| F16C 17/10 | (2006.01) | |
| F16C 33/74 | (2006.01) | |

(52) U.S. Cl.
CPC .......... *F16C 17/102* (2013.01); *F16C 17/107* (2013.01); *F16C 33/745* (2013.01);
(Continued)

(58) Field of Classification Search
CPC .. F16C 17/102; F16C 17/107; F16C 2370/12; F16C 33/745; H02K 5/167; H02K 5/1677
(Continued)

(56) References Cited

U.S. PATENT DOCUMENTS 7,284,909 B2 * 10/2007 Aiello .................... F16C 17/102
                                                       384/112
2003/0231813 A1 * 12/2003 Gomyo ................. F16C 17/102
                                                       384/107
(Continued)

FOREIGN PATENT DOCUMENTS

| JP | 2006-214541 | 8/2006 |
| JP | 2008-111520 | 5/2008 |

(Continued)

OTHER PUBLICATIONS

Translation of foreign document JP 2006214541 A (Year: 2006).*
(Continued)

*Primary Examiner* — Alex W Mok
(74) *Attorney, Agent, or Firm* — Wenderoth, Lind & Ponack, L.L.P.

(57) ABSTRACT

Provided is a fluid dynamic bearing device (1), including: a bearing sleeve (8) made of sintered metal; a rotary member (2) including a shaft portion (21) and a hub portion (23); and first and second thrust bearing portions (T1, T2) that form thrust bearing gaps respectively on an upper end surface (8*b*) and a lower end surface (8*c*) of the bearing sleeve (8) along with rotation of the rotary member (2). At least an outer peripheral surface of the bearing sleeve (8) is subjected to pore sealing treatment. A sealing gap (S) for retaining an oil surface of lubricating oil is made along a tapered outer peripheral surface (8*d*1) of the bearing sleeve (8). A lid
(Continued)

member (10) having a bottomed cylindrical shape being fixed to an outer periphery of a lower end of the bearing sleeve (8).

10 Claims, 4 Drawing Sheets

(52) U.S. Cl.
CPC ........... *H02K 5/167* (2013.01); *H02K 5/1677* (2013.01); *F16C 2370/12* (2013.01)

(58) Field of Classification Search
USPC .......................................................... 310/90
See application file for complete search history.

(56) References Cited

U.S. PATENT DOCUMENTS

| | | | |
|---|---|---|---|
| 2005/0058374 A1* | 3/2005 | Gomyo | F16C 33/103 384/119 |
| 2008/0075398 A1* | 3/2008 | Kimura | F16C 17/04 384/107 |
| 2009/0046960 A1* | 2/2009 | Hibi | F16C 17/02 384/107 |
| 2011/0142387 A1 | 6/2011 | Sato et al. | |
| 2013/0121627 A1 | 5/2013 | Jun | |
| 2013/0147294 A1* | 6/2013 | Oh | G11B 19/2036 310/90 |
| 2013/0162082 A1* | 6/2013 | Kim | H02K 5/165 310/90 |
| 2013/0193792 A1* | 8/2013 | Kim | H02K 5/15 310/90 |
| 2013/0234551 A1* | 9/2013 | Yu | F16C 32/0633 310/90 |

FOREIGN PATENT DOCUMENTS

| | | |
|---|---|---|
| JP | 2010-60098 | 3/2010 |
| JP | 2013-104560 | 5/2013 |

OTHER PUBLICATIONS

International Preliminary Report on Patentability & Written Opinion of the International Searching Authority dated Jun. 14, 2016 in corresponding International (PCT) Application No. PCT/JP2014/082285.

International Search Report dated Mar. 3, 2015 in International (PCT) Application No. PCT/JP2014/082285.

* cited by examiner

FLUID DYNAMIC BEARING DEVICE AND MOTOR PROVIDED THEREWITH

TECHNICAL FIELD

The present invention relates to a fluid dynamic bearing device and a motor including the fluid dynamic bearing device.

BACKGROUND ART

As is well known, fluid dynamic bearing devices have features in, for example, their high speed rotation, high rotational accuracy, and quietness. Thus, the fluid dynamic bearing devices are suitably used as bearing devices for motors to be mounted to various electrical apparatus such as information apparatus, for example, as bearing devices for spindle motors to be built in disk drives such as HDDs, for fan motors to be built in PCs and other devices, or for polygon scanner motors to be built in laser beam printers (LBPs).

For example, in Patent Literature 1, there is disclosed a fluid dynamic bearing device (spindle motor) including a bearing sleeve made of sintered metal, a rotary member including a shaft portion inserted along an inner periphery of the bearing sleeve, and a hub portion arranged on an axially outer side with respect to one end surface of the bearing sleeve, and a radial bearing portion and a thrust bearing portion configured to support the rotary member in a non-contact manner respectively in a radial direction and a thrust direction. Along with rotation of the rotary member, a radial bearing gap of the radial bearing portion is formed between an inner peripheral surface of the bearing sleeve and an outer peripheral surface of the shaft portion opposed to the inner peripheral surface of the bearing sleeve, and a thrust bearing gap of the thrust bearing portion is formed between the one end surface of the bearing sleeve and an end surface of the hub portion opposed to the one end surface of the bearing sleeve. In this fluid dynamic bearing device, the bearing sleeve is fixed to an inner periphery of a housing having a bottomed cylindrical shape. An opening portion of the housing is formed between an outer peripheral surface of the housing and an inner peripheral surface of the hub portion, and is sealed by a sealing gap that retains an oil surface of lubricating oil. With this configuration, leakage of the lubricating oil to an outside can be prevented as much as possible, thereby being capable of stably maintaining desired bearing performance.

CITATION LIST

Patent Literature 1: JP 2013-104560 A

SUMMARY OF INVENTION

Technical Problem

In recent years, HDDs have been rapidly increased in capacity and become less expensive. Accordingly, fluid dynamic bearing devices need to be further enhanced in rotational accuracy and reduced in cost. As a technological method for enhancing the rotational accuracy of the fluid dynamic bearing devices, it is conceivable to increase the area of the thrust bearing surface to be formed on the end surface of the bearing sleeve, thereby enhancing bearing rigidity of the thrust bearing portion. However, as in the fluid dynamic bearing device of Patent Literature 1, when the bearing sleeve is fixed to the inner periphery of the housing that is separate from the bearing sleeve, there is a limitation on increase in radial thickness of the bearing sleeve, that is, increase in area of the end surface (thrust bearing surface) of the bearing sleeve. Further, in the fluid dynamic bearing device of Patent Literature 1, the sealing gap is formed particularly along an outer periphery of one end of the housing. For such reasons, the bearing sleeve and the housing need to be independently formed with high accuracy, and also fixed to each other with high accuracy. Thus, there is a difficulty in reduction in manufacturing cost.

In view of the circumstances, it is an object of the present invention to inexpensively provide a fluid dynamic bearing device that is excellent in bearing performance particularly in a thrust direction, and is capable of stably maintaining desired bearing performance.

Solution to Problem

According to one embodiment of the present invention, which has been devised to achieve the above-mentioned object, there is provided a fluid dynamic bearing device, comprising: a bearing sleeve made of sintered metal; a rotary member comprising: a shaft portion inserted along an inner periphery of the bearing sleeve; and a hub portion expanding radially outward from one end of the shaft portion; a radial bearing portion configured to support the rotary member in a non-contact manner in a radial direction, the radial bearing portion forming a radial bearing gap between an inner peripheral surface of the bearing sleeve and an outer peripheral surface of the shaft portion opposed to the inner peripheral surface of the bearing sleeve along with rotation of the rotary member; and a thrust bearing portion configured to support the rotary member in a non-contact manner in one thrust direction, the thrust bearing portion forming a thrust bearing gap between one end surface of the bearing sleeve and an end surface of the hub portion opposed to the one end surface of the bearing sleeve along with the rotation of the rotary member, wherein at least an outer peripheral surface of the bearing sleeve being subjected to pore sealing treatment, wherein a sealing gap for retaining an oil surface of lubricating oil is made along an outer peripheral surface of one end of the bearing sleeve, and wherein a lidmember having a bottomed cylindrical shape being fixed to an outer periphery of another end of the bearing sleeve. Note that, the "hub portion" of the present invention is not limited to a disk hub capable of holding disks (disc-like information recording media), and conceptually encompasses a rotor having blades or a polygon mirror.

According to the above-mentioned configuration, even when the housing employed in the fluid dynamic bearing device of Patent Literature 1 is omitted, leakage of the lubricating oil to an outside can be prevented, thereby being capable of stably maintaining desired bearing performance. Further, when the housing can be omitted, by an amount corresponding to a thickness of the housing, the bearing sleeve is allowed to be increased in radial thickness (bearing sleeve is allowed to be increased in outer diameter dimension). Thus, the one end surface of the bearing sleeve can be increased in area, thereby being capable of enhancing the bearing performance of the thrust bearing portion.

Further, in the present invention, the sealing gap is formed along the outer peripheral surface of the one end of the bearing sleeve. Thus, only by forming the bearing sleeve with high accuracy, not only desired sealing performance but also desired bearing performance can be secured. Further, in the present invention, the lid member having the bottomed cylindrical shape is fixed to the outer periphery of the another end of the bearing sleeve. This lid member only needs to have a function to prevent leakage of the lubricating oil through, for example, surface pores of another end surface or other surfaces of the bearing sleeve and another end opening portion of a shaft hole of the bearing sleeve to an outside of the device. Thus, the lid member need not have as high shape accuracy and high accuracy at the time of fixation to the bearing sleeve as those required for the housing. Further, the pore sealing treatment only needs to be performed so that at least surface pores of the outer peripheral surface of the bearing sleeve (surface exposed to the outside of the bearing) are securely sealed, and hence accuracy in forming a pore sealing portion need not be particularly high. In this way, an advantage of cost reduction, which can be obtained by replacing the housing with the lid member, overcomes cost increase due to a need for additional pore sealing treatment for the bearing sleeve. Thus, the overall fluid dynamic bearing device can be manufactured at low cost.

As the pore sealing treatment, there may be employed treatment such as what is called pore filling treatment for sealing surface pores through plastic working or other processing for a surface to be treated (for example, outer peripheral surface of the bearing sleeve), treatment of curing a sealer filled (impregnated) in the surface pores opened in the surface to be treated, and film formation treatment for forming a plating film or other films for covering the surface to be treated. Of those, the treatment of curing the sealer filled in the surface pores of the surface to be treated is particularly suited for its high practicability and absence of influence on a shape of the surface to be treated. Note that, it is preferred that the sealer be excellent in adhesion property with respect to the bearing sleeve, and there may be employed, for example, an epoxy resin.

The rotary member may comprise a flange portion arranged between the bearing sleeve (specifically, another end surface thereof) and the lid member (specifically, inner bottom surface thereof). In this case, in a region between the another end surface of the bearing sleeve and an end surface of the flange portion opposed to the another end surface of the bearing sleeve, another thrust bearing gap of another thrust bearing portion configured to support the rotary member in a non-contact manner in another thrust direction may be formed.

In the above-mentioned configuration, an axial through-hole may be opened in the one end surface and the another end surface of the bearing sleeve. With this, spaces to be formed respectively on the one end surface and the another end surface of the bearing sleeve are allowed to communicate to each other with the through-hole. Thus, even when pressure imbalance occurs in the lubricating oil in the bearing device, the pressure imbalance is immediately eliminated. As a result, desired bearing performance can be stably maintained.

The lid member may comprise a step portion to be axially engaged with the another end surface of the bearing sleeve. With this, under a state in which relative axial positions of the bearing sleeve and the lid member are accurately controlled, the lid member can be fixed to the bearing sleeve.

Although a method of fixing the lid member to the bearing sleeve is not particularly limited, it is preferred to employ bonding that not only allows the lid member and the bearing sleeve to be fixed easily and firmly to each other, but also allows the surface pores of the outer peripheral surface of the bearing sleeve to be sealed at the same time.

The lid member having the bottomed cylindrical shape maybe obtained, for example, through press working of metal (metal plate), or injection molding of a resin. With this, the lid member of high accuracy can be mass-produced at low cost. Further, the lid member is fixed to the outer periphery of the another end of the bearing sleeve, and hence an outer peripheral surface of the lid member can be utilized as a mounting surface with respect to a motor base. In this case, when the lid member is made of metal, high bonding strength can be secured between the lid member and the motor base.

Due to satisfactory processability of the sintered metal, on the inner peripheral surface of the bearing sleeve, a dynamic pressure generating portion (radial dynamic pressure generating portion) configured to generate fluid dynamic pressure in the lubricating oil interposed in the radial bearing gap can be formed. Further, for the same reason, on at least one of both the end surfaces of the bearing sleeve, a dynamic pressure generating portion (thrust dynamic pressure generating portion) configured to generate fluid dynamic pressure in the lubricating oil interposed in the thrust bearing gap formed on the at least one end surface can be formed.

The fluid dynamic bearing device according to the present invention has the above-mentioned various features. Thus, the fluid dynamic bearing device can be suitably used by being built in various small-size motors such as a spindle motor for disk drives, a fan motor for PCs, or a polygon scanner motor for LBPs, and can also contribute to cost reduction of those various motors.

Advantageous Effects of Invention

As described above, according to the present invention, it is possible to achieve the fluid dynamic bearing device that is excellent in bearing performance particularly in the thrust direction, and is capable of stably maintaining desired bearing performance while being manufacturable at low cost.

DESCRIPTION OF EMBODIMENTS

Now, description is made of embodiments of the present invention with reference to the drawings.

Figure 1:
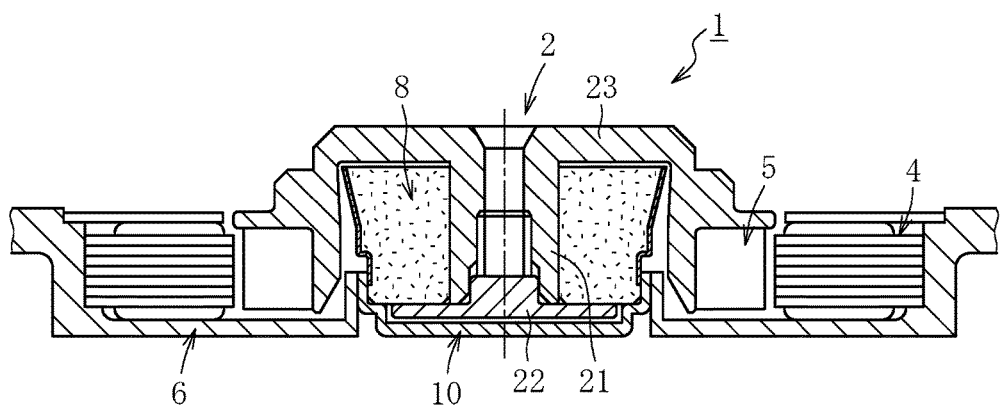
FIG. 1 is a schematic cross-sectional view for illustrating a configuration example of a motor having a fluid dynamic bearing device built therein.

FIG. 1 is a schematic cross-sectional view for illustrating a spindle motor having a fluid dynamic bearing device built therein. This spindle motor is used in disk drives such as HDDs, and comprises a fluid dynamic bearing device 1 configured to support a rotary member 2 in a freely rotatable manner, stator coils 4 and a rotor magnet 5 opposed to each other across a radial gap, and a motor base 6 configured to hold the fluid dynamic bearing device 1 on its inner periphery. The stator coils 4 are mounted to the motor base 6, whereas the rotor magnet 5 is mounted to a disk hub, specifically, a hub portion 23 forming the rotary member 2. Although not shown, one or a plurality of disks (disc-like information recording media) are held by the disk hub. In this configuration, when the stator coils 4 are energized, an electromagnetic force generated between the stator coils 4 and the rotor magnet 5 causes the rotor magnet 5 to be rotated. In conjunction therewith, the rotary member 2 is rotated.

Figure 2:
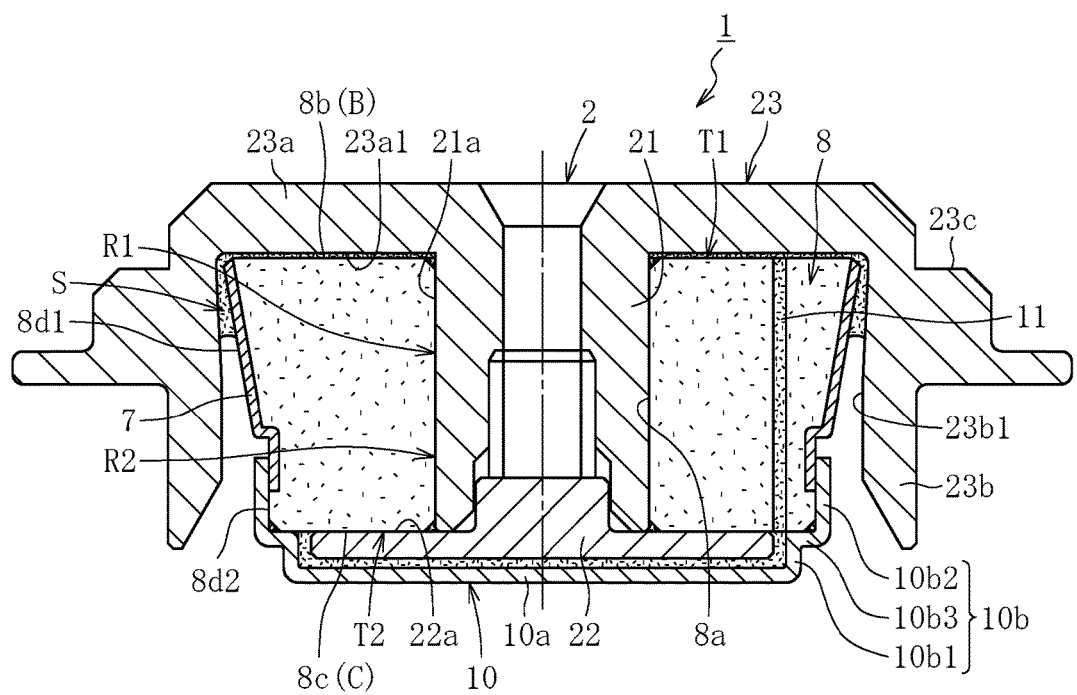
FIG. 2 is a cross-sectional view for illustrating a fluid dynamic bearing device according to a first embodiment of the present invention.

FIG. 2 is a view for illustrating a fluid dynamic bearing device 1 according to a first embodiment of the present invention. This fluid dynamic bearing device 1 comprises the rotary member 2, a substantially circular cylindrical bearing sleeve 8 having a shaft hole for allowing a shaft portion 21 of the rotary member 2 to be inserted thereinto, and a lid member 10 fixed to the bearing sleeve 8. An interior space is filled with lubricating oil being a lubricating fluid (indicated by densely dotted hatching). In the following description, for the sake of convenience of description, a side on which the lid member 10 is arranged is referred to as a lower side, and an opposite side in an axial direction is referred to as an upper side. However, this definition does not limit use of the fluid dynamic bearing device 1.

The rotary member 2 comprises the shaft portion 21 inserted along an inner periphery of the bearing sleeve 8, a flange portion 22 expanding radially outward from a lower end of the shaft portion 21, and the disk hub, specifically, the hub portion 23 expanding radially outward from an upper end of the shaft portion 21. In this embodiment, the flange portion 22 is fixed to the lower end of the shaft portion 21 with screws, and the hub portion 23 is formed integrally with the shaft portion 21. The hub portion 23 comprises a disc-like portion 23a arranged above the bearing sleeve 8, a cylindrical portion 23b that extends downward from a radially outer end portion of the disc-like portion 23a and allows the rotor magnet 5 (refer to FIG. 1) to be mounted to an outer periphery of the cylindrical portion 23b, and a disk mounting surface 23c configured to allow the disks (not shown) to be mounted thereto.

Figure 3:
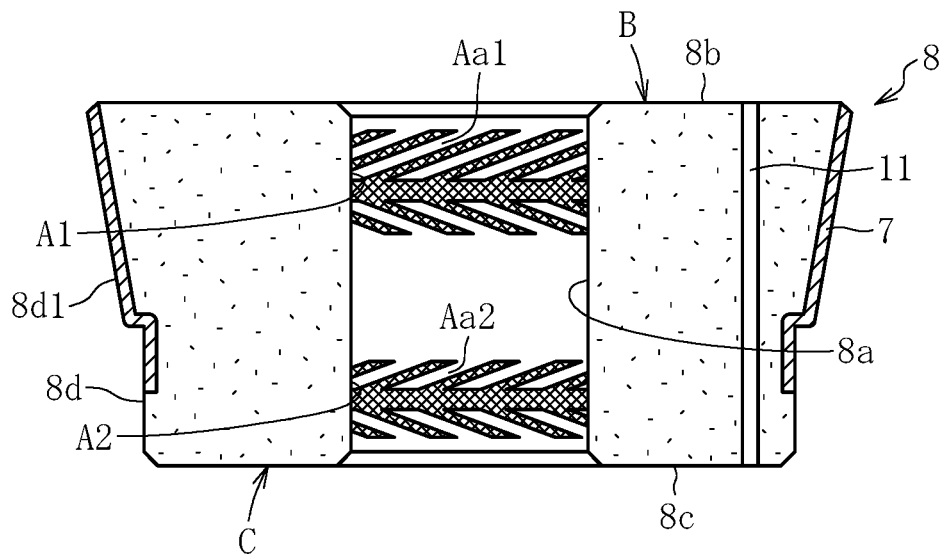
FIG. 3 is a schematic cross-sectional view for illustrating a bearing sleeve illustrated in FIG. 2.

The bearing sleeve 8 is obtained by forming a porous body of sintered metal containing, as a main component, copper or iron into a substantially circular cylindrical shape. As illustrated in FIG. 3, on an inner peripheral surface 8a of the bearing sleeve 8, circular cylindrical radial bearing surfaces A1, A2 that form radial bearing gaps of radial bearing portions R1, R2 between the inner peripheral surface 8a of the bearing sleeve 8 and an outer peripheral surface 21a of the shaft portion 21 opposed to the inner peripheral surface 8a are formed at two axial positions apart from each other. Respectively on the radial bearing surfaces A1, A2, dynamic pressure generating portions (radial dynamic pressure generating portions) configured to cause dynamic pressure generating action in the lubricating oil interposed in the radial bearing gaps are formed. The radial dynamic pressure generating portion formed on the upper radial bearing surface A1 comprises a plurality of dynamic pressure generating grooves Aa1 arrayed in a herringbone pattern, and hill portions that define the dynamic pressure generating grooves Aa1. The radial dynamic pressure generating portion formed on the lower radial bearing surface A2 comprises a plurality of dynamic pressure generating grooves Aa2 arrayed in a herringbone pattern, and hill portions that define the dynamic pressure generating grooves Aa2. In the upper radial dynamic pressure generating portion, an axial dimension of the dynamic pressure generating grooves Aa1 in an upper region is larger than an axial dimension of the dynamic pressure generating grooves Aa1 in a lower region. In the lower radial dynamic pressure generating portion, an axial dimension of the dynamic pressure generating grooves Aa2 in an upper region and an axial dimension of the dynamic pressure generating grooves Aa2 in a lower region are each equal to the axial dimension of the dynamic pressure generating grooves Aa1 in the lower region in the radial dynamic pressure generating portion formed on the upper radial bearing surface A1.

Figure 4:
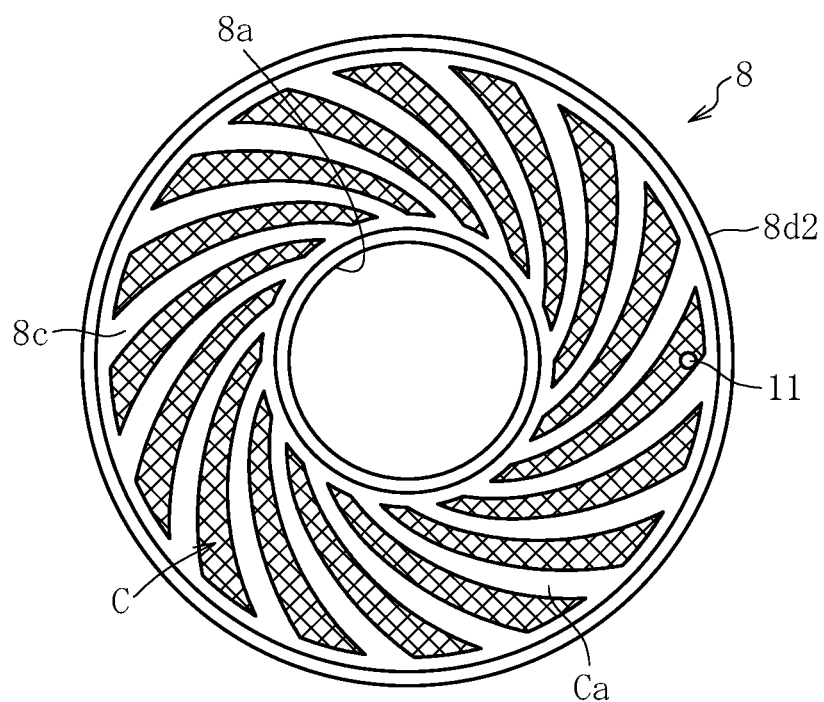
FIG. 4 is a plan view for illustrating a lower end surface of the bearing sleeve illustrated in FIG. 2.

On a lower end surface 8c of the bearing sleeve 8, an annular thrust bearing surface C that forms a thrust bearing gap (second thrust bearing gap) of a second thrust bearing portion T2 between the lower end surface 8c of the bearing sleeve 8 and an upper end surface 22a of the flange portion 22 opposed to the lower end surface 8c is formed. On the thrust bearing surface C, a thrust dynamic pressure generating portion configured to cause dynamic pressure generating action in the lubricating oil interposed in the second thrust bearing gap is formed. As illustrated, for example, in FIG. 4, in the thrust dynamic pressure generating portion, dynamic pressure generating grooves Ca in a spiral pattern and hill portions that define the dynamic pressure generating grooves Ca are formed alternately to each other in a circumferential direction.

Further, on an upper end surface 8b of the bearing sleeve 8, an annular thrust bearing surface B that forms a thrust bearing gap (first thrust bearing gap) of a first thrust bearing portion T1 between the upper end surface 8b of the bearing sleeve 8 and a lower end surface 23a1 of the disc-like portion 23a of the hub portion 23 opposed to the upper end surface 8b is formed. Although not shown in detail, on the thrust bearing surface B, there is formed a thrust dynamic pressure generating portion in which dynamic pressure generating grooves in a spiral pattern, for example, and hill portions that define the dynamic pressure generating grooves are formed alternately to each other in the circumferential direction.

An outer peripheral surface of the bearing sleeve 8 comprises a tapered outer peripheral surface 8d1 arranged relatively on the upper side and gradually increased upward in diameter, and a circular cylindrical outer peripheral surface 8d2 arranged relatively on the lower side and extending in the axial direction. In a region between the tapered outer peripheral surface 8d1 and an inner peripheral surface (circular cylindrical inner peripheral surface) 23b1 of the cylindrical portion 23b of the hub portion 23 opposed to the tapered outer peripheral surface 8d1, a wedge-like sealing gap S gradually reduced upward in radial dimension is formed. During operation of the fluid dynamic bearing device 1, this sealing gap S communicates to a radially outer side of the thrust bearing gap in the first thrust bearing portion T1. Further, the sealing gap S has a function of a buffer for absorbing an amount of a volume change accompanied with a temperature change of the lubricating oil filled in the interior space of the fluid dynamic bearing device 1. With this, within a range of an assumed temperature change, an oil level of the lubricating oil can be always maintained within an axial range of the sealing gap S. Although not shown, on the outer peripheral surface of the bearing sleeve 8, in a region that is axially adjacent to the sealing gap S (specifically, in a region of the circular cylindrical outer peripheral surface 8d2, which does not interfere with the lid member 10), an oil repellent film may be formed. With this, leakage of the lubricating oil to an outside is effectively prevented.

The bearing sleeve 8 has an axial through-hole 11 that is opened in the upper end surface 8b (thrust bearing surface B) and the lower end surface 8c (thrust bearing surface C). This through-hole 11 is formed at one or a plurality of positions in the circumferential direction (in this embodiment, at one position in the circumferential direction; refer to FIG. 4). In this case, the through-hole 11 is molded at the same time with compression molding of a green compact.

Figure 5:
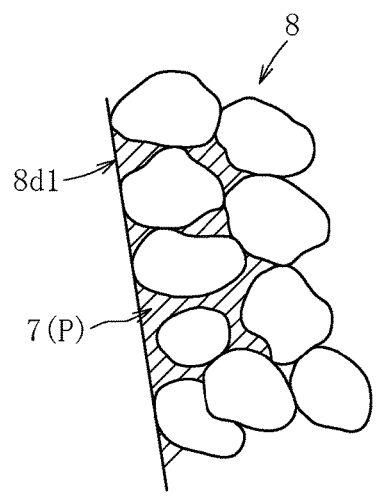
FIG. 5 is a partial schematic enlarged view for illustrating the fluid dynamic bearing device illustrated in FIG. 2.

The bearing sleeve 8 comprises a pore sealing portion 7 configured to seal surface pores opened in the outer peripheral surface of the bearing sleeve 8. The pore sealing portion 7 can be formed, for example, through film formation treatment for forming plating films or other films, or what is called pore filling treatment. In this embodiment, as illustrated on an enlarged scale in FIG. 5, the pore sealing portion 7 is formed through filling and curing of a sealer P in the surface pores of the outer peripheral surface. As the sealer P, for example, an epoxy resin excellent in adhesion property with respect to the bearing sleeve 8 is used. The pore sealing portion 7 may be formed on the entire outer peripheral surface of the bearing sleeve 8 (tapered outer peripheral surface 8d1 and circular cylindrical outer peripheral surface 8d2). In this embodiment, the pore sealing portion 7 is formed from an upper end portion of the outer peripheral surface to a substantially axial central portion of the circular cylindrical outer peripheral surface 8d2. This is because, as described below, the lid member 10 is fixed through bonding to a lower region of the circular cylindrical outer peripheral surface 8d2. Specifically, an adhesive for fixing the lidmember 10 functions as the pore sealing portion 7, and in addition, the lower region of the circular cylindrical outer peripheral surface 8d2 is covered with the lid member 10. In this embodiment, a region in which the pore sealing portion 7 is formed and a region in which the lid member 10 is fixed (cylindrical portion 10b) are overlapped with each other in the axial direction.

The bearing sleeve 8 having the above-mentioned configuration can be manufactured, for example, in the following procedures. First, raw-material powder containing copper-based powder or iron-based powder as a main component and an appropriate filler blended therewith is subjected to compression molding so as to be formed into a green compact having a shape of a substantially finished product. Then, this green compact is transformed into a sintered compact through heating at a sintering temperature or higher. Next, this sintered compact is subjected to correction processing (sizing) so as to be finished into a shape of a finished product. At the same time, respectively on an inner peripheral surface and both end surfaces of the sintered compact, the radial dynamic pressure generating portions and the thrust dynamic pressure generating portions are molded. After that, pore sealing treatment is performed on an outer peripheral surface of the sintered compact so that the pore sealing portion 7 is formed.

Further, the axial through-hole 11 opened in both the end surfaces 8b, 8c of the bearing sleeve 8 may be molded at the same time with the compression molding of the raw-material powder (green compact), or may be formed through machining of the sintered compact. In addition, the radial dynamic pressure generating portions and the thrust dynamic pressure generating portions may be molded at the same time with the compression molding of the green compact.

The lid member 10 has a bottomed cylindrical shape integrally comprising a disc-like bottom portion 10a arranged below the flange portion 22 and the cylindrical portion 10b formed upright along a radially outer end portion of the bottom portion 10a. The cylindrical portion 10b of this embodiment comprises a small-diameter cylindrical portion 10b1 arranged on a radially outer side with respect to the flange portion 22, a large-diameter cylindrical portion 10b2 arranged above the small-diameter cylindrical portion 10b1, and a step portion 10b3 extending in a direction orthogonal to an axial line and connecting both the cylindrical portions 10b1, 10b2 to each other. An axial dimension of the small-diameter cylindrical portion 10b1 (axial distance between an upper end surface of the bottom portion 10a and an upper end surface of the step portion 10b3) is set to a value equal at least to a sum of a thickness of the flange portion 22 and gap widths of the two thrust bearing gaps formed during rotation of the rotary member 2. The lid member 10 is formed, for example, through press working of a conductive metal plate.

The lid member 10 having the above-mentioned configuration is mounted and fixed to the bearing sleeve 8 by fixing an inner peripheral surface of the large-diameter cylindrical portion 10b2 to an outer periphery of a lower end of the bearing sleeve 8 (lower region of the circular cylindrical outer peripheral surface 8d2) under a state in which the upper end surface of the step portion 10b3 is held in abutment against a radially outer region of the lower end surface 8c of the bearing sleeve 8 (state in which the step portion 10b3 and the bearing sleeve 8 are engaged with each other in the axial direction). As long as a desired fixing force can be exerted, the method of fixing the lid member 10 to the bearing sleeve 8 is not particularly limited. In this embodiment, through intermediation of an adhesive layer interposed between the inner peripheral surface of the large-diameter cylindrical portion 10b2 and the lower region of the circular cylindrical outer peripheral surface 8d2 of the bearing sleeve 8, which are opposed to each other, the lid member 10 and the bearing sleeve 8 are fixed to each other. With the above-mentioned configuration, leakage of the lubricating oil through surface pores on the outer periphery of the lower end of the bearing sleeve 8 (in the lower region of the circular cylindrical outer peripheral surface 8d2, where the pore sealing portion 7 is not formed), surface pores of the lower end surface 8c of the bearing sleeve 8, and a lower end opening portion of the shaft hole of the bearing sleeve 8 is prevented.

As illustrated in FIG. 2, in this embodiment, the cylindrical portion 10b (large-diameter cylindrical portion 10b2) of the lid member 10 obtained through press forming of the metal plate is overlapped in the axial direction with apart of the radial bearing surface A2 formed on the inner peripheral surface 8a of the bearing sleeve 8. In such a case, when the large-diameter cylindrical portion 10b2 of the lid member 10 is press-fitted to the bearing sleeve 8 with a large interference, the outer peripheral surface (circular cylindrical outer peripheral surface 8d2) of the bearing sleeve 8 is deformed. This deformation may have adverse effects not only on shape accuracy of the radial bearing surface A2, but also on bearing performance of the radial bearing portion R2. Thus, it is preferred that the lid member 10 be fixed to the bearing sleeve 8 through what is called gap-filling bonding, or press-fit bonding of press-fitting the large-diameter cylindrical portion 10b2 with such an interference that the adverse effects on the shape accuracy of the radial bearing surface A2 are avoided.

The fluid dynamic bearing device 1 having the above-mentioned configuration is assembled in the following procedures. First, the shaft portion 21 integrally comprising the hub portion 23 is inserted along the inner periphery of the bearing sleeve 8, and then the flange portion 22 is fixed to the lower end of the shaft portion 21. Next, the lid member 10 is fitted to the outer periphery of the lower end of the bearing sleeve 8, and the lid member 10 and the bearing sleeve 8 are fixed to each other through bonding. The fixation through bonding between the bearing sleeve 8 and the lid member 10 is performed under the state in which the upper end surface of the step portion 10b3 of the lid member 10 is held in abutment against the lower end surface 8c of the bearing sleeve 8. With this, due to the above-mentioned setting of the axial dimension of the small-diameter cylindrical portion 10b1 of the lid member 10, the bearing sleeve 8 and the lid member 10 can be fixed to each other under a state in which relative axial positions of the bearing sleeve 8 and the lid member 10 are accurately controlled (state in which the two thrust bearing gaps are accurately formed). After that, the lubricating oil (such as ester-based lubricating oil) is filled into the interior space of the fluid dynamic bearing device 1 so as to fill internal pores of the bearing sleeve 8, the radial bearing gaps in the radial bearing portions R1, R2, the thrust bearing gap in the first thrust bearing portion T1, the thrust bearing gap in the second thrust bearing portion T2, and other spaces. With this, the fluid dynamic bearing device 1 illustrated in FIG. 2 is completed.

In the fluid dynamic bearing device 1 having the above-mentioned configuration, when the rotary member 2 is rotated, the radial bearing gaps are formed between the radial bearing surfaces A1, A2 formed at upper and lower two positions of the inner peripheral surface 8a of the bearing sleeve 8, and the outer peripheral surface 21a of the shaft portion 21 opposed to the radial bearing surfaces A1, A2. Then, along with rotation of the rotary member 2, pressure of oil films formed in both the radial bearing gaps is increased by the dynamic pressure generating action of the radial dynamic pressure generating portions, and the radial bearing portions R1, R2 configured to support the rotary member 2 in a non-contact manner in the radial direction are formed at two axial positions apart from each other.

At the same time, in the regions between the thrust bearing surface B formed on the upper end surface 8b of the bearing sleeve 8 and the lower end surface 23a1 of the disc-like portion 23a of the hub portion 23 opposed to the thrust bearing surface B, and between the thrust bearing surface C formed on the lower end surface 8c of the bearing sleeve 8 and the upper end surface 22a of the flange portion 22 opposed to the thrust bearing surface C, the thrust bearing gaps are respectively formed. Then, along with the rotation of the rotary member 2, pressure of oil films formed in both the thrust bearing gaps is increased by the dynamic pressure generating action of the thrust dynamic pressure generating portions, and the first thrust bearing portion T1 and the second thrust bearing portion T2 configured to support the rotary member 2 in a non-contact manner in one thrust direction and another thrust direction are formed.

Further, when the rotary member 2 is rotated, due to the difference in axial dimension between the upper and lower dynamic pressure generating grooves Aa1 of the upper radial dynamic pressure generating portion, the lubricating oil interposed in the gaps between the inner peripheral surface 8a of the bearing sleeve 8 and the outer peripheral surface 21a of the shaft portion 21 flows downward and circulates through a path formed by the thrust bearing gap in the second thrust bearing portion T2, the axial through-hole 11 opened in both the end surfaces 8b, 8c of the bearing sleeve 8, and the thrust bearing gap in the first thrust bearing portion T1, and is drawn again into the radial bearing gap in the radial bearing portion R1.

With this configuration, pressure balance of the lubricating oil can be maintained, and problems such as generation of air bubbles involved in local generation of negative pressure, and leakage of the lubricating oil and occurrence of vibration due to the generation of air bubbles can be solved. The radially outer side of the thrust bearing gap in the first thrust bearing portion T1 communicates to the sealing gap S. Thus, even when the air bubbles are formed in the lubricating oil for some reason or other, while the air bubbles circulate with the lubricating oil through the above-mentioned path, the air bubbles are discharged to the outside air through an oil surface (gas-liquid interface) of the lubricating oil in the sealing gap S. With this, the adverse effects to be caused by the air bubbles are more effectively prevented.

The fluid dynamic bearing device 1 having the above-mentioned configuration is built in a motor by fixing an outer peripheral surface of the lid member 10 through, for example, bonding to a circular cylindrical inner peripheral surface of the motor base 6 (refer to FIG. 1) made of a metal material such as an aluminum alloy. The lid member 10 and the motor base 6 are each made of metal, and hence the fluid dynamic bearing device 1 can be fixed to the motor base 6 with high bonding strength.

As described above, in the fluid dynamic bearing device 1 according to the present invention, the pore sealing treatment is performed at least on the outer peripheral surface of the bearing sleeve 8, the sealing gap S that retains the oil surface of the lubricating oil is formed between the outer peripheral surface of the upper end of the bearing sleeve 8 (tapered outer peripheral surface 8d1) and the inner peripheral surface 23b1 of the hub portion 23 opposed to the outer peripheral surface of the bearing sleeve 8, and the lid member 10 having the bottomed cylindrical shape is fixed to the outer periphery of the lower end of the bearing sleeve 8 (lower region of the circular cylindrical outer peripheral surface 8d2). With this configuration, even when the housing employed in the fluid dynamic bearing device of Patent Literature 1 is omitted, leakage of the lubricating oil to the outside can be prevented, thereby being capable of stably maintaining desired bearing performance. Further, when the housing can be omitted, by an amount corresponding to a radial thickness of the housing, the bearing sleeve 8 is allowed to be increased in radial thickness (bearing sleeve 8 is allowed to be increased in outer diameter dimension). With this, the upper end surface 8b (thrust bearing surface B) and the lower end surface 8c (thrust bearing surface C) of the bearing sleeve 8 can be increased in area, thereby being capable of enhancing bearing rigidity of the first thrust bearing portion Ti and the second thrust bearing portion T2.

Further, the sealing gap S is formed along the outer peripheral surface (tapered outer peripheral surface 8d1) of the bearing sleeve 8. Thus, only by forming the bearing sleeve 8 with high accuracy, desired sealing performance can be secured. In the present invention, the lid member 10 having the bottomed cylindrical shape is fixed to the outer periphery of the lower end of the bearing sleeve 8. The lid member 10 only needs to have a function to prevent leakage of the lubricating oil through, for example, the surface pores of the bearing sleeve 8 and the lower end opening portion of the shaft hole of the bearing sleeve 8 to the outside of the device. Thus, the lid member 10 need not have as high shape accuracy and high accuracy at the time of fixation to the bearing sleeve 8 as those required for the housing used in the fluid dynamic bearing device of Patent Literature 1. Further, the pore sealing treatment only needs to be performed so that at least the surface pores of the outer peripheral surface of the bearing sleeve 8 are securely sealed, and hence accuracy in forming the pore sealing portion 7 need not be particularly high. In this way, an advantage of cost reduction, which can be obtained by replacing the housing with the lid member 10, overcomes cost increase due to a need for additional pore sealing treatment for the bearing sleeve 8. Thus, the overall fluid dynamic bearing device 1 can be manufactured at low cost.

As described above, according to the present invention, it is possible to achieve the fluid dynamic bearing device 1 that is excellent in bearing performance particularly in the thrust direction, and is capable of stably maintaining desired bearing performance while being manufacturable at low cost.

Figure 6:
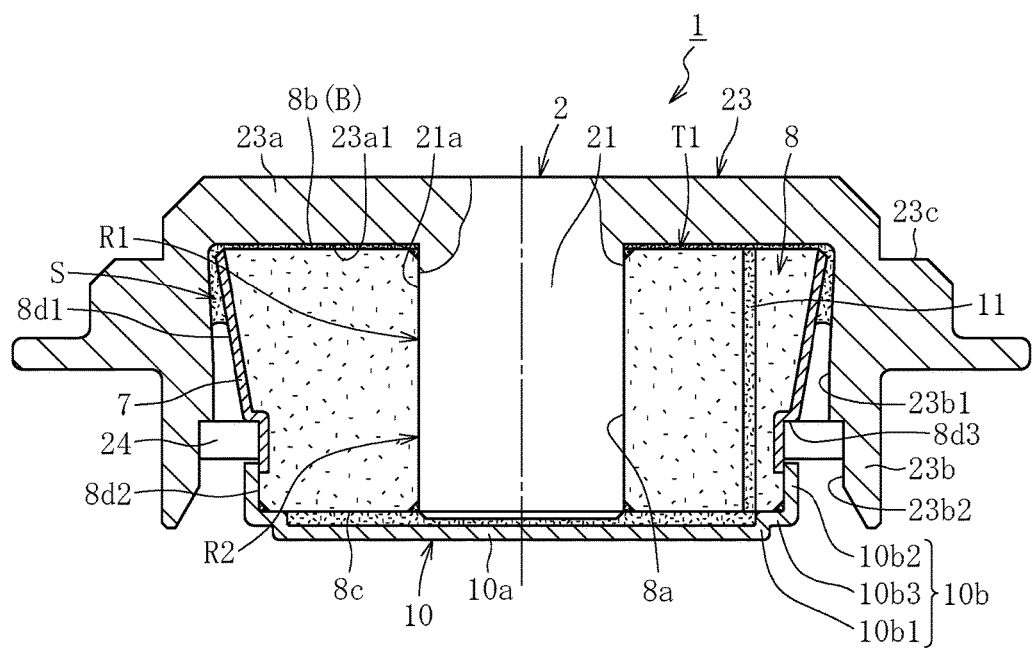
FIG. 6 is a cross-sectional view for illustrating a fluid dynamic bearing device according to a second embodiment of the present invention.

FIG. 6 is a view for illustrating a fluid dynamic bearing device 1 according to a second embodiment of the present invention. The fluid dynamic bearing device 1 illustrated in FIG. 6 is different from the fluid dynamic bearing device 1 illustrated in FIG. 2 mainly in that the flange portion 22 is omitted and the second thrust bearing portion T2 configured to support the rotary member 2 in the another thrust direction is accordingly omitted. When such a configuration is employed, by a size corresponding to the omitted flange portion 22, the fluid dynamic bearing device 1 can be compactified in the axial direction. Alternatively, by the size corresponding to the omitted flange portion 22, the bearing sleeve 8 may be extended in the axial direction so that an axial distance between the radial bearing portions R1, R2 is increased. When the axial distance between the radial bearing portions R1, R2 is increased, moment rigidity can be enhanced.

When the flange portion 22 is omitted as described above, a function to retain the rotary member 2 (shaft portion 21) is not exerted. Thus, in the fluid dynamic bearing device 1 of this embodiment, a large-diameter inner peripheral surface 23b2 is formed along the cylindrical portion 23b of the hub portion 23, and an annular retaining member 24 to be axially engaged with a step surface 8d3 formed along the outer periphery of the bearing sleeve 8 is fixed to the large-diameter inner peripheral surface 23b2. With this, the rotary member 2 is retained.

Figure 7:
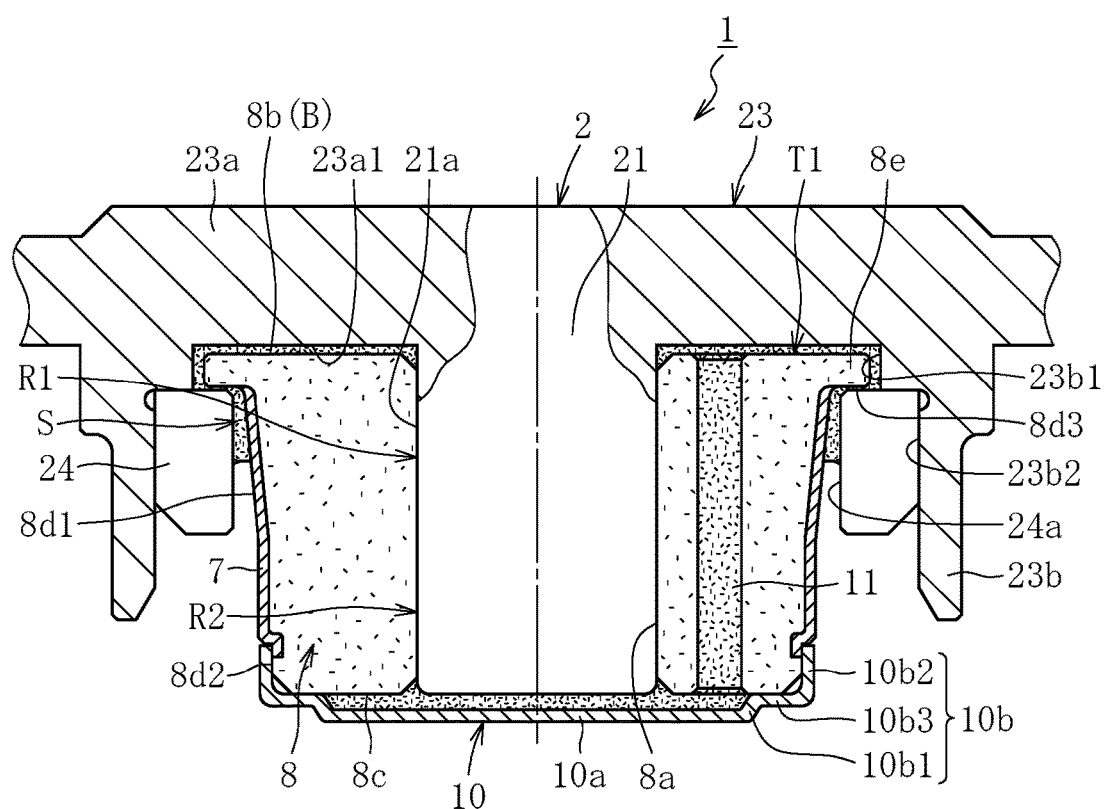
FIG. 7 is a cross-sectional view for illustrating a fluid dynamic bearing device according to a third embodiment of the present invention.

FIG. 7 is a view for illustrating a fluid dynamic bearing device 1 according to a third embodiment of the present invention. The fluid dynamic bearing device 1 illustrated in FIG. 7 is a modification of the fluid dynamic bearing device 1 illustrated in FIG. 6, and has the main differences as follows. An outer peripheral portion of the bearing sleeve 8 is partially thinned so as to form a flange portion 8e along the outer peripheral portion of the upper end of the bearing sleeve 8, and a lower end surface of this flange portion 8e is utilized as the step surface 8d3 to be axially engaged with the annular retaining member 24 fixed to the large-diameter inner peripheral surface 23b2 of the hub portion 23. In addition, the tapered outer peripheral surface 8d1 is formed under the flange portion 8e (step surface 8d3), and the sealing gap S is formed between the tapered outer peripheral surface 8d1 and an inner peripheral surface 24a of the retaining member 24. In short, in the fluid dynamic bearing device 1 illustrated in FIG. 7, an engaging position between the retaining member 24 (rotary member 2) and the bearing sleeve 8, and a formation position of the sealing gap S are inverted to those in the fluid dynamic bearing device 1 illustrated in FIG. 6.

When such a configuration is employed, a substantially L-shaped labyrinth gap in which the lubricating oil is interposed is formed between the thrust bearing gap in the thrust bearing portion (first thrust bearing portion) T1 and the sealing gap S. Thus, there is an advantage in that an evaporation amount of the lubricating oil interposed in the interior space of the fluid dynamic bearing device 1 can be reduced. Further, by the presence of the labyrinth gap, even when an axial dimension of the sealing gap S is reduced, the buffering function required for the sealing gap S can be secured. Thus, an axial dimension of a surface for forming the sealing gap S (in this case, tapered outer peripheral surface 8d1), which needs to be secured on the outer peripheral surface of the bearing sleeve 8, can be reduced. Accordingly, when the oil repellent film is formed on the outer peripheral surface of the bearing sleeve 8, the oil repellent film can be formed over a larger area. As a result, there is an advantage in that a degree of freedom in selecting a formation position of the oil repellent film is higher than that in the fluid dynamic bearing device 1 illustrated in FIG. 6.

The fluid dynamic bearing devices 1 according to the embodiments of the present invention are described above, and modifications may be made appropriately to the fluid dynamic bearing device 1 without departing from the gist of the present invention.

For example, in each of the fluid dynamic bearing devices 1 described above, the rotary member 2 having the shaft portion 21 and the hub portion 23 formed integrally with each other is used, but the shaft portion 21 and the hub portion 23 may be formed independently of each other and fixed by an appropriate method. In this case, in the fluid dynamic bearing device 1 illustrated in FIG. 2, the rotary member 2 having the hub portion 23 fixed by an appropriate method to an integral piece of the shaft portion 21 and the flange portion 22 may be used.

Further, in the fluid dynamic bearing devices 1 described above, only the outer peripheral surface of the lid member 10 is used as a mounting surface with respect to the motor base 6, but the outer peripheral surface of the bearing sleeve 8 may be utilized as the mounting surface with respect to the motor base 6. In this case, as long as there are no problems with fixing strength with respect to the motor base 6, the lidmember 10 formed through injection molding of a resin may be used.

Still further, in the fluid dynamic bearing devices 1 described above, the radial dynamic pressure generating portions are formed on the inner peripheral surface 8a (radial bearing surfaces A1, A2) of the bearing sleeve 8, but the radial dynamic pressure generating portions may be formed on the outer peripheral surface 21a of the shaft portion 21 opposed to the inner peripheral surface 8a across the radial bearing gaps. Similarly, the thrust dynamic pressure generating portions formed on the upper end surface 8b (thrust bearing surface B) and the lower end surface 8c (thrust bearing surface C) of the bearing sleeve 8 may be formed on the end surfaces opposed thereto.

Yet further, in the fluid dynamic bearing devices 1 described above, the pore sealing portion 7 is formed only on the outer peripheral surface of the bearing sleeve 8, but the pore sealing portion 7 may be formed on another surface of the bearing sleeve 8, or may be formed on the entire surfaces of the bearing sleeve 8.

Yet further, the present invention is suitably applicable also to fluid dynamic bearing devices in which any one or both of the radial bearing portions R1, R2 are formed of other publicly known fluid dynamic bearings such as what is called a multi-lobe bearing, a step bearing, and a wave bearing, and also to fluid dynamic bearing devices in which any one or both of the thrust bearing portions T1, T2 are formed of other publicly known fluid dynamic bearings such as what is called a step bearing and a wave bearing.

Yet further, the present invention is applicable not only to the fluid dynamic bearing device 1 in which the hub portion 23 is formed of a disk hub configured to hold a disk, but also suitably applicable to a fluid dynamic bearing device 1 in which the hub portion 23 comprises a rotor having blades or a rotor having a polygon mirror. In other words, the present invention is suitably applicable not only to the fluid dynamic bearing device 1 built in the spindle motor as illustrated in FIG. 1, but also to a fluid dynamic bearing device 1 built in motors for other electrical apparatus, such as a fan motor for PCs and a polygon scanner motor for laser beam printers (LBPs).

REFERENCE SIGNS LIST 1 fluid dynamic bearing device
2 rotary member
21 shaft portion
22 flange portion
23 hub portion
7 pore sealing portion
8 bearing sleeve
8b upper end surface (one end surface)
8c lower end surface (other end surface)
8d1 tapered outer peripheral surface
8d2 circular cylindrical outer peripheral surface
10 lid member
10a bottom portion
10b cylindrical portion
10b3 step portion
11 through-hole
24 retaining member
P sealer
S sealing gap
R1, R2 radial bearing portion
T1, T2 thrust bearing portion

The invention claimed is:

1. A fluid dynamic bearing device, comprising:
a bearing sleeve made of sintered metal;
a rotary member comprising:
a shaft portion inserted along an inner periphery of the bearing sleeve; and
a hub portion expanding radially outward from one end of the shaft portion;
a radial bearing portion configured to support the rotary member in a non-contact manner in a radial direction, the radial bearing portion forming a radial bearing gap between an inner peripheral surface of the bearing sleeve and an outer peripheral surface of the shaft portion opposed to the inner peripheral surface of the bearing sleeve along with rotation of the rotary member; and
a thrust bearing portion configured to support the rotary member in a non-contact manner in one thrust direction, the thrust bearing portion forming a thrust bearing gap between one end surface of the bearing sleeve and an end surface of the hub portion opposed to the one end surface of the bearing sleeve along with the rotation of the rotary member,
wherein at least an outer peripheral surface of the bearing sleeve is subjected to pore sealing treatment,
wherein a sealing gap for retaining an oil surface of lubricating oil is made along an outer peripheral surface of one end of the bearing sleeve,
wherein a lid member having a bottomed cylindrical shape is fixed to an outer periphery of another end of the bearing sleeve, and
wherein a pore sealing portion formed by the pore sealing treatment is exposed to the atmosphere.

2. The fluid dynamic bearing device according to claim 1, wherein the pore sealing treatment comprises curing a sealer filled in surface pores of the bearing sleeve.

3. The fluid dynamic bearing device according to claim 1, wherein the rotary member further comprises a flange portion arranged between the bearing sleeve and the lid member, and
wherein the fluid dynamic bearing device further comprises another thrust bearing portion configured to support the rotary member in a non-contact manner in another thrust direction, the another thrust bearing portion forming another thrust bearing gap between another end surface of the bearing sleeve and an end surface of the flange portion opposed to the another end surface of the bearing sleeve.

4. The fluid dynamic bearing device according to claim 1, wherein the fluid dynamic bearing device has an axial through-hole opened in the one end surface and another end surface of the bearing sleeve.

5. The fluid dynamic bearing device according to claim 1, wherein the lid member comprises a step portion to be axially engaged with another end surface of the bearing sleeve.

6. The fluid dynamic bearing device according to claim 1, wherein the lid member is fixed to the bearing sleeve through bonding.

7. The fluid dynamic bearing device according to claim 1, wherein the lid member is obtained through press working of metal.

8. The fluid dynamic bearing device according to claim 1, wherein the bearing sleeve comprises a dynamic pressure generating portion formed on the inner peripheral surface of the bearing sleeve.

9. The fluid dynamic bearing device according to claim 1, wherein the bearing sleeve further comprises another dynamic pressure generating portion formed on at least one of the one end surface or another end surface of the bearing sleeve.

10. A motor, comprising the fluid dynamic bearing device of claim 1.

* * * * *